United States Patent
Everton et al.

(10) Patent No.: US 10,187,342 B2
(45) Date of Patent: Jan. 22, 2019

(54) EMAIL PRIVACY ENFORCEMENT

(71) Applicant: eTorch Inc., Chicago, IL (US)

(72) Inventors: Paul R Everton, Chicago, IL (US); Chad M Gilles, Chicago, IL (US)

(*) Notice: Subject to any disclaimer, the term of this patent is extended or adjusted under 35 U.S.C. 154(b) by 0 days.

(21) Appl. No.: 15/613,343

(22) Filed: Jun. 7, 2017

(65) Prior Publication Data

US 2018/0097761 A1   Apr. 5, 2018

Related U.S. Application Data

(63) Continuation of application No. 15/285,797, filed on Oct. 5, 2016, now Pat. No. 9,674,129.

(51) Int. Cl.
| | |
|---|---|
| *G06F 15/16* | (2006.01) |
| *H04L 12/58* | (2006.01) |
| *H04L 29/06* | (2006.01) |
| *H04L 29/08* | (2006.01) |

(52) U.S. Cl.
CPC ............ *H04L 51/18* (2013.01); *H04L 51/063* (2013.01); *H04L 63/101* (2013.01); *H04L 63/1408* (2013.01); *H04L 51/12* (2013.01); *H04L 63/168* (2013.01); *H04L 67/02* (2013.01); *H04L 67/22* (2013.01)

(58) Field of Classification Search
CPC ..... H04L 51/18; H04L 51/063; H04L 63/101; H04L 63/1408; H04L 51/12; H04L 63/168; H04L 67/02; H04L 67/22
USPC ........................................................ 709/206
See application file for complete search history.

(56) References Cited

U.S. PATENT DOCUMENTS

| | | |
|---|---|---|
| 5,864,684 A | 1/1999 | Nielson |
| 7,072,947 B1 | 7/2006 | Knox |
| 7,076,533 B1 | 7/2006 | Knox |
| 7,240,199 B2 | 7/2007 | Tomkow |
| 7,404,209 B2 | 7/2008 | Shipp |
| 7,421,498 B2 | 9/2008 | Packer |
| 7,487,540 B2 | 2/2009 | Shipp |
| 7,966,372 B1 | 6/2011 | Tomkow |
| 8,015,250 B2 | 9/2011 | Kay |

(Continued)

OTHER PUBLICATIONS

Ugly Email Website, www.uglyemail.com, accessed Dec. 20, 2015.
(Continued)

*Primary Examiner* — Melvin H Pollack

(57) ABSTRACT

A system comprises email message parsing circuitry, tracking code suspect analyzer circuitry, reporting circuitry, and message modification circuitry. The email message parsing circuitry is operable to, after reception of an email message via a SMTP connection and prior to the email message being made available in a mailbox of a recipient of the email message, scan the email message to extract a tracking code suspect. The tracking code suspect analyzer circuitry is operable to analyze the tracking code suspect to determine, based on one or more characteristics of the tracking code suspect, whether the tracking code suspect is tracking code. The reporting circuitry is operable to, after a determination that the tracking code suspect is tracking code, generate a report that indicates the presence of tracking code in the email message. The message modification circuitry is operable to replace the tracking code suspect in the email message with replacement content.

19 Claims, 13 Drawing Sheets

(56) References Cited

U.S. PATENT DOCUMENTS

| | | |
|---|---|---|
| 8,069,213 B2 | 11/2011 | Bloch |
| 8,826,432 B2 | 9/2014 | Dabbiere |
| 8,832,206 B2 | 9/2014 | Bhagat |
| 8,904,168 B1 | 12/2014 | Emigh |
| 9,003,552 B2 | 4/2015 | Goodwin |
| 9,436,449 B1 * | 9/2016 | Chandnani ........ G06F 17/30902 |
| 9,462,068 B2 * | 10/2016 | Pieczul .................. G06F 11/36 |
| 9,508,102 B2 * | 11/2016 | Thibaux ............ G06F 17/30867 |
| 9,514,459 B1 * | 12/2016 | Doshi ..................... G06F 21/30 |
| 9,553,918 B1 * | 1/2017 | Manion .............. H04L 67/2823 |
| 9,565,090 B1 * | 2/2017 | Maykov ................. H04L 43/10 |
| 9,654,541 B1 * | 5/2017 | Kapczynski ............ H04L 67/02 |
| 9,674,129 B1 * | 6/2017 | Everton ................. H04L 51/18 |
| 9,870,349 B2 * | 1/2018 | Wei ..................... G06F 17/2247 |
| 2005/0015482 A1 | 1/2005 | Blankenship |
| 2005/0154728 A1 | 7/2005 | Greve |
| 2008/0275762 A1 | 11/2008 | Cutler |
| 2009/0138711 A1 | 5/2009 | Heimbigner |
| 2012/0150984 A1 | 6/2012 | Farnell |
| 2013/0036138 A1 | 2/2013 | Bellows |
| 2017/0132469 A1 * | 5/2017 | Yiu .................... G06K 9/00718 |
| 2017/0132660 A1 * | 5/2017 | Barclay .............. G06Q 30/0251 |
| 2017/0251004 A1 * | 8/2017 | Thomas .............. H04L 63/1425 |
| 2017/0255368 A1 * | 9/2017 | Audet ............... G06F 17/30994 |
| 2017/0364211 A1 * | 12/2017 | Kerr ...................... G06F 3/0482 |
| 2018/0011942 A1 * | 1/2018 | Zaretsky ........... G06Q 30/0277 |
| 2018/0034850 A1 * | 2/2018 | Turgeman ............... H04L 63/08 |
| 2018/0048673 A1 * | 2/2018 | Hunt ................... H04L 63/1483 |
| 2018/0053224 A1 * | 2/2018 | McClave ................. G06Q 50/01 |
| 2018/0054414 A1 * | 2/2018 | Levasseur ............ G06Q 10/107 |
| 2018/0063190 A1 * | 3/2018 | Wright ............... H04L 63/1416 |

OTHER PUBLICATIONS

"Ways to Avoid Email Tracking," New York Times, Dec. 24, 2014.
"Trackbuster Lets You Remove Those Pesky Email Tracking Beacons," Techcrunch, Jul. 9, 2015.

* cited by examiner

EMAIL PRIVACY ENFORCEMENT

PRIORITY CLAIM

This application is a continuation of U.S. patent application Ser. No. 15/285,797 filed on Oct. 6, 2016, which is hereby incorporated herein by reference.

BACKGROUND

Limitations and disadvantages of conventional approaches to email will become apparent to one of skill in the art, through comparison of such approaches with some aspects of the present method and system set forth in the remainder of this disclosure with reference to the drawings.

BRIEF SUMMARY

Methods and systems are provided for email privacy enforcement, substantially as illustrated by and/or described in connection with at least one of the figures, as set forth more completely in the claims.

DETAILED DESCRIPTION

Figure 1A:
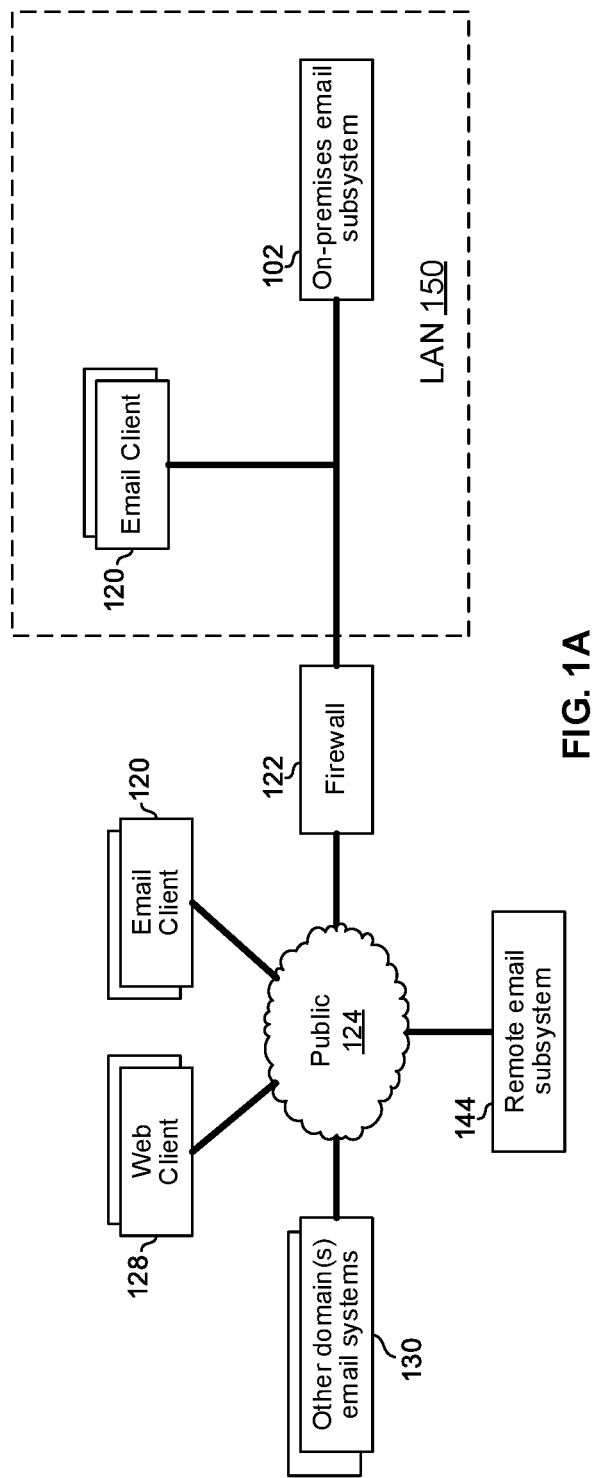
FIGS. 1A and 1B illustrates an example network comprising a system configured to protect the privacy of email interactions.

FIG. 1A illustrates an example network comprising a system configured to protect the privacy of email interactions. Shown are an on-premises email subsystem 102 (which operates as the email server(s) for domain x.com), a plurality of email clients 120, a firewall 122, a plurality of web clients 128, a plurality of mail systems 130 (which operate as the email servers for domains other than X.com), and remote email subsystem 144. The firewall 122, some of the email clients 120, the web clients 128, other domain email systems 130, and remote email subsystem 144 are interconnected via a public network 124 (e.g., the Internet).

The firewall 122 comprises circuitry operable to monitor and control traffic coming into and out of the local area network (LAN) 150.

Each email client 120 is, for example, a desktop, laptop, tablet, or phone configured to run email client software such as Microsoft Outlook, Mozilla Thunderbird, or the like. Some of the email clients 120 are connected to the email subsystem 102 via connections contained within LAN 150, and others are connected via public network 124 and firewall 122. The email clients 120 may connect to the email subsystem 102 using a protocol such as SMTP, MAPI, IMAP, EAS, EWS, and/or POP3.

Each web client 128 is, for example, a desktop, laptop, tablet, or phone configured to run a web browser such as Google Chrome, Mozilla Firefox, or the like. A user of a web mail client 128 may access the email subsystem 102 by browsing to a webmail interface (e.g., https://www.owa.x.com) in the web browser.

The email systems 130 handle email for domains other than x.com (e.g., y.com). Each of the mail systems 130 may be substantially the same as the mail system comprising subsystem(s) 102 and/or 144 ("email system 102/104") or may comprise one or more conventional email servers.

Various aspects of this disclosure are directed to an email system operable to process incoming and/or outgoing email messages in accordance with a data privacy policy (and/or other email policies) put in place by an administrator of the email system. In various example implementations, the email system 102/144 is implemented entirely in an on-premises email subsystem 102, entirely in a remote email subsystem 144, or is distributed among the on-premises subsystem 102 and the remote email subsystem 144. An example implementation of the email system 102/144 comprising one or both of email subsystem 102 and email subsystem 144 is described below with reference to FIG. 1B, to which attention is now directed.

The email system 102/144 comprises hardware 116 that in turn comprises processing circuitry 104 (e.g., one or more chipsets or systems-on-chip comprising one or more CPUs, memory, one or more graphics processors, one or more I/O controllers, etc.), network interface circuitry 106 (e.g., Ethernet, Wi-Fi, and/or the like) and storage circuitry 108 (e.g., one or more hard disk drives, solid state drives, and/or the like, and associated control/drive circuitry). The hardware 116 is configured by software and/or firmware 118 to realize special purpose circuitry for handling email as described in this disclosure. In an example implementation, the special purpose circuitry comprises connection handler circuitry 110, privacy enforcement circuitry 112, background message processing circuitry 113, message storage handling circuitry 114, content caching circuitry 115, and analytics and reporting circuitry 117.

The connection handler circuitry 110 is operable to connect the email system 102/144 to email clients 120, web clients 128, and other email systems 130 using HTTP/HTTPS, SMTP, MAPI, IMAP, EAS, EWS, POP3, and/or any other suitable protocol(s).

Figure 2:
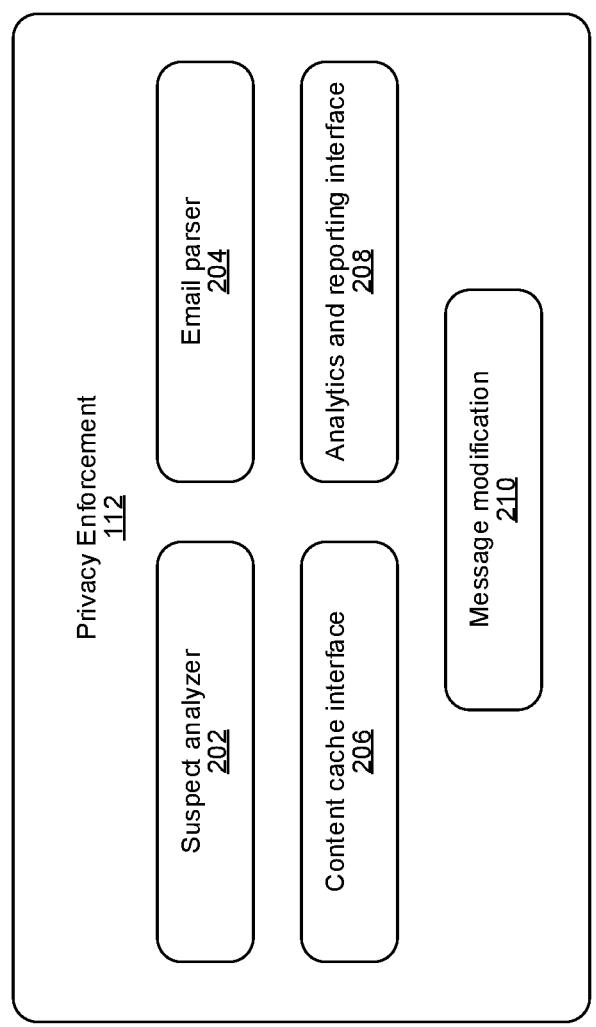
FIG. 2 depicts an example implementation of the privacy enforcement circuitry of FIG. 1B.

The privacy enforcement circuitry 112 is operable to analyze the content of email messages coming into and/or going out of email system 102/144. The privacy enforcement circuitry 112 is operable to handle the email messages (e.g., redirect, drop, archive, etc.) based on the results of the analysis. Such handling may include, for example, modifying the content of the email messages (e.g., add text and/or HTML elements, remove text and/or HTML elements, change text formatting, and/or the like) as desired or necessary based on a data privacy policy that is in place. In an example implementation, the data privacy policy is a no-tracking policy applicable to emails meeting determined criteria (e.g., email messages to and/or from particular users. Email messages having particular content in their headers, body, and/or attachments, and/or the like), and the privacy enforcement circuitry 112 performs the process(es) of FIG. 4A and/or FIG. 4B for each received email to which the no-tracking policy is applicable. An example implementation of the privacy enforcement circuitry is shown in FIG. 2.

The background message processing circuitry 113 is operable to scan an email message and/or external content associated with email message in parallel with the email message being processed by privacy enforcement circuitry 112 and message storage handling circuitry 114. In this manner, background message processing circuitry 113 may continue to analyze a copy of an email message and/or external content associated with the email message after the email message has been placed in its recipient(s) inbox(es). An example operation of the background message processing circuitry 113 is described below with reference to FIGS. 10 and 11.

The message storage handling circuitry 114 is operable to store email messages and metadata pertaining to the email messages to storage circuitry 108. The message storage handling circuitry 114 is operable to retrieve email messages and metadata pertaining to the email messages from storage circuitry 108.

The content caching circuitry 115 is operable to store and serve content embedded in, linked to by, and/or attached to email messages sent and/or received by the email system 102/144. The content may be cached at a location identified by a unique uniform resource locator (URL) accessible via one or more networking protocols (e.g., FTP, HTTP/HTTPS, RDMA, etc.). The content may be cached at a location identified by a unique file path and file name and accessible via one or more local memory access protocols (e.g., POSIX commands of a local operating system). In an example implementation, the content caching circuitry 115 retrieves content from a first URL (e.g., a URL extracted from an incoming and/or outgoing email message by the privacy enforcement circuitry 112), stores the content in storage circuitry 108, and makes the stored content accessible via a second URL (e.g., a URL generated by the privacy enforcement circuitry 112).

The analytics and reporting circuitry 117 is operable collect, analyze, and generate data and/or metadata extracted from, and/or generated based on, email messages received and/or sent by the email system 102/144.

Figure 1B:
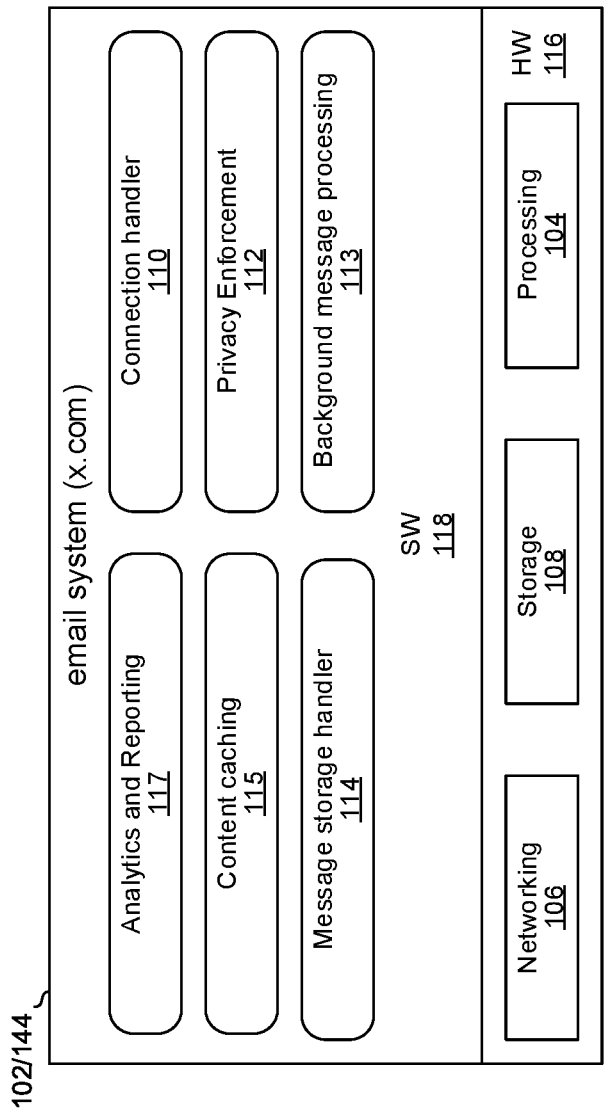

FIG. 2 depicts an example implementation of the privacy enforcement circuitry of FIG. 1B. The example implementation comprises tracking suspect analyzer circuitry 202, email message parsing circuitry 204, content cache interface circuitry 206, analytics and reporting interface circuitry 208, and message modification circuitry 210.

The email message parsing circuitry 204 is operable to scan email message contents (SMTP envelope, message headers, message body, and attachments) for tracking code suspects (e.g., raw binary and/or encoded content containing predefined strings and/or matching predefined regular expressions), and, upon finding a tracking code suspect, pass the tracking code suspects to the tracking suspect analyzer circuitry 202.

The tracking suspect analyzer circuitry 202 is operable to apply a tracking code identification algorithm to the tracking code suspects received from the email message parsing circuitry 204 to determine, for each suspect, whether it is in-fact a tracking code. The tracking suspect analyzer circuitry 202 may also be operable to characterize identified tracking code. Such characteristics may include, for example: a vendor or organization associated with particular tracking code; amount and/or type of information revealed by the tracking code; risk level associated with the tracking code, and/or the like.

In an example implementation, tracking code suspects may include <img> HTML elements, and the tracking suspect analyzer circuitry 202 determines whether a suspect is in-fact tracking code based on characteristics of the <img> element. Such characteristics may include, for example, one or more of: the size of the <img> element (e.g., <img> elements with size below some threshold number of pixels may be more likely to be identified as tracking code); transparency of the <img> element (e.g., <img> elements having a transparency attribute that is above a determined threshold may be more likely to be identified as tracking code); color(s) of the <img> element (e.g., <img> elements that are the same as or similar to a background color may be more likely to be flagged as tracking code); randomness of a URL of the <img> element (e.g., <img> elements having URLs with long strings of hexadecimal characters not having dictionary entries may be more likely to be identified as tracking code); length of a URL of the <img> element (e.g., <img> elements having very long URLs may be more likely to be identified as tracking code); presence of particular word(s) or regular expressions in a URL of the <img> element; any aliases or IP address(es) associated with a URL of the <img> element in a DNS records (e.g., the tracking suspect analyzer circuitry 202 may be operable to perform DNS lookups); a URL to which a URL of the <img> element redirects (e.g., the tracking suspect analyzer circuitry 202 may be operable run a sandboxed web browser via which it attempts to visit the URL and follows any redirects); location of the <img> element within the message body (e.g., <img> elements after the signature of an email message may be more likely to be identified as tracking code); whether and how many times an identical or similar <img> element has been detected (e.g., the same <img> element appearing many times within the same email message or a particular group of email messages may be more likely to be identified as tracking code); and/or based on an image file associated with (e.g., via URL or file path) the <img> element (e.g., previous images having the same file signature were associated with identified tracking code, previous images with the same binary content were associated with identified tracking code, and/or the visible content of the image file as determined by a "machine vision" or pattern recognition algorithm performed on the image by the tracking suspect analyzer circuitry 202).

In an example implementation, tracking code suspects may include <a> HTML elements, and the tracking suspect analyzer circuitry 202 may determine whether a suspect is in-fact tracking code based on characteristics of the <a> element. Such characteristics may, for example, include one or more of: randomness of a URL of the <a> element (e.g., <a> elements having URLs with long strings of hexadecimal characters not having dictionary entries may be more likely to be identified as tracking code); length of a URL of the <a> element (e.g., <a> elements having very long URLs may be more likely to be identified as tracking code); presence of particular word(s) or regular expressions in a URL of the <a> element; any aliases or IP address(es) associated with a URL of the <a> element in a DNS records; and/or a URL to which a URL of the <a> element redirects (e.g., the tracking suspect analyzer circuitry 202 may be operable run a sandboxed web browser via which it attempts to visit the URL).

In an example implementation, tracking code suspects may include any <script> HTML elements, and the tracking suspect analyzer circuitry 202 may determine whether a suspect is in-fact tracking code based on characteristics of the <script> element. Such characteristics may include one or more of: randomness of a URL of the <script> element (e.g., <script> elements having URLs with long strings of hexadecimal characters may be more likely to be identified as tracking code); length of a URL of the <script> element (e.g., <script> elements having very long URLs may be more likely to be identified as tracking code); presence of particular word(s) or regular expressions in a URL of the <script> element; any aliases or IP address(es) associated with a URL of the <script> element in a DNS records; and/or a URL to which a URL of the <script> element redirects (e.g., the tracking suspect analyzer circuitry 202 may be operable run a sandboxed web browser via which it attempts to visit the URL).

In an example implementation, tracking code suspects may include <link> HTML elements, and the tracking suspect analyzer circuitry 202 may determine whether a suspect is in-fact tracking code based on characteristics of the <link> element. Such characteristics may include one or more of: randomness of a URL of the <link> element (e.g., <link> elements having URLs with long strings of hexadecimal characters may be more likely to be identified as tracking code); length of a URL of the <link> element (e.g., <a> elements having very long URLs may be more likely to be identified as tracking code); presence of particular word(s) or regular expressions in a URL of the <link> element; any aliases or IP address(es) associated with a URL of the <link> element in a DNS records; and/or a URL to which a URL of the <link> element redirects (e.g., the tracking suspect analyzer circuitry 202 may be operable run a sandboxed web browser via which it attempts to visit the URL).

The content cache interface circuitry 206 is operable to: (1) receive, from the tracking suspect analyzer circuitry 202, a first URL pointing to a location at which content (e.g., images, videos, etc.) is stored, and a second URL via which the content is to be accessible when cached in the email system 102/144; and (2) provide the first URL, and the second URL to the content caching circuitry 115 for caching of the content.

The analytics and reporting interface circuitry 208 is operable to convey data and metadata from the email message parsing circuitry 204 and/or the suspect analyzer circuitry 202 to the analytics and reporting circuitry 117. Such data and/or metadata may include, for example: number of email messages processed by email message parsing circuitry 204; number of suspects found by email message parsing circuitry 204; number of tracking code suspects identified as tracking code by tracking suspect analyzer circuitry 202; categorizations/characteristics of tracking code identified by tracking suspect analyzer circuitry 202; and/or the like.

The message modification circuitry 210 is operable to modify headers, message bodies, and/or attachments of email messages processed by the privacy enforcement circuitry 112. The modification of an email message header may comprise, for example, adding a header, removing a header, modifying a header. The modification of an email message body may comprise, for example, adding text, adding an HTML element (e.g., an <img> HTML element having a URL that points to a location in the email system 102/144), modifying text, modifying an HTML element, removing text, and/or removing an HTML element. The modification of an email message attachment may comprise, for example, adding text, adding an HTML element, modifying text, modifying an HTML element, removing text, and/or removing an HTML element.

Figure 3:
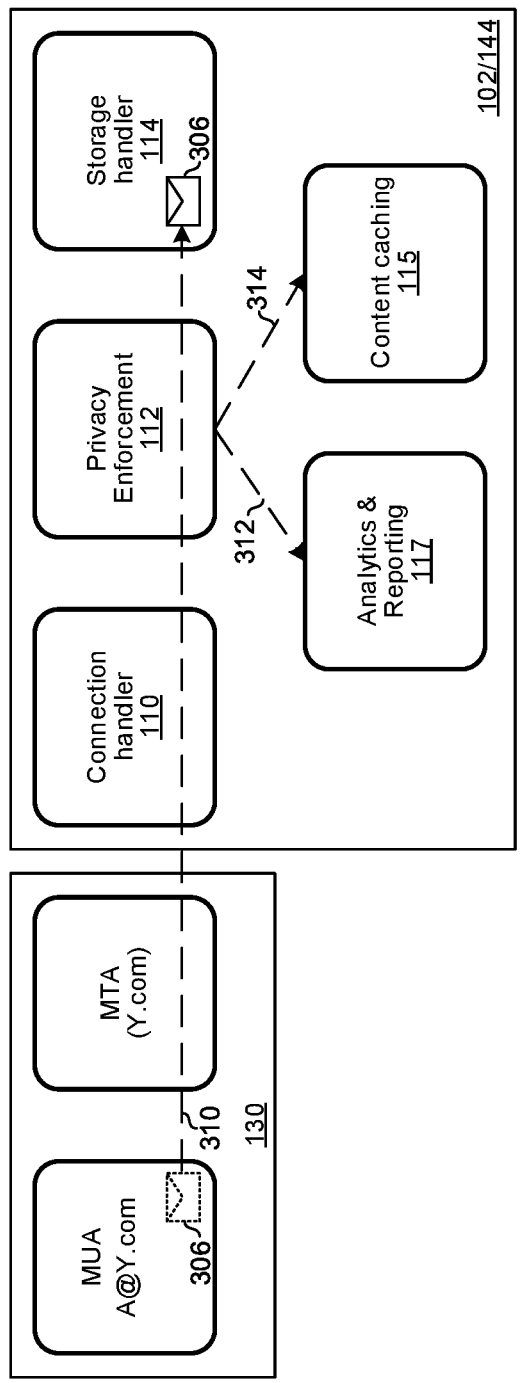
FIG. 3 illustrates a first example flow of an email message through the system of FIG. 1 during reception of the email message by the email system of FIG. 1.

FIG. 3 illustrates a first example flow of an email message through the system of FIG. 1 during reception of the email message by email system of FIG. 1. Arrow 310 represents propagation of an email message 306 that is (1) generated in a mail user agent (MUA) of email system 130; (2) communicated to a mail transfer agent (MTA) of email system 130 (e.g., via SMTP); (3) communicated to email system 102/144 (e.g., via a SMTP connection to connection handler circuitry 110); (4) processed via privacy enforcement circuitry 112; and (5) stored by message storage handling circuitry 114 at which point the email message 306 is available to (and, in some instances, may be pushed to) its recipient(s)' mailbox(es). Arrow 312 illustrates data and/or metadata being passed to analytics and reporting circuitry 117. Arrow 314 illustrates data and/or metadata being passed to content caching circuitry 115.

Figure 4A:
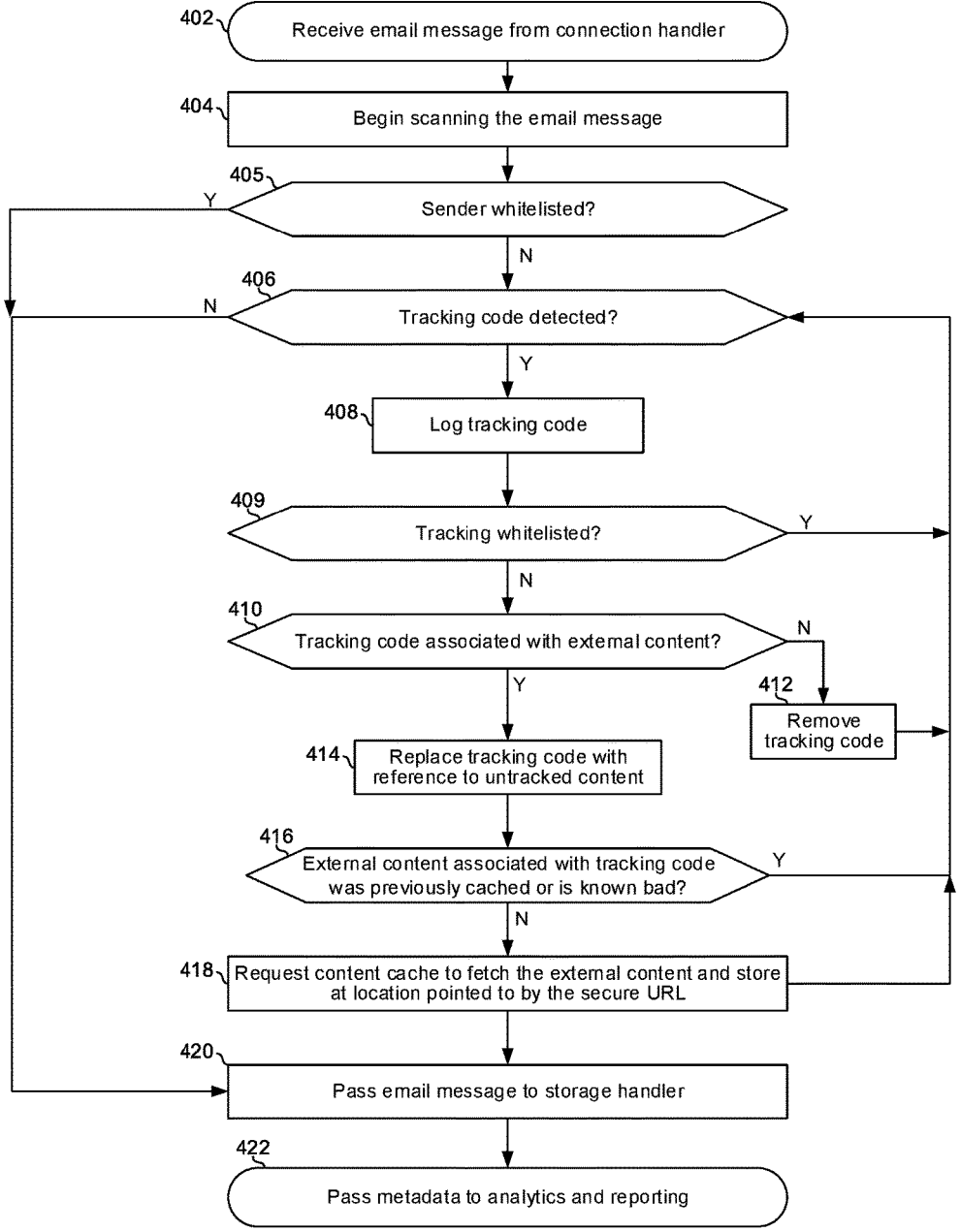
FIG. 4A is a flowchart illustrating an example process performed by the privacy enforcement circuitry of FIG. 1.

FIG. 4A is a flowchart illustrating an example process performed by the privacy enforcement circuitry of FIG. 1. The process is described with reference to elements shown in FIGS. 2 and 3. The process begins with block 402 which takes place after the email message 306 has been received by connection handler circuitry 110 via SMTP and has been passed to privacy enforcement circuitry 112, but before the email message 306 is made available in the inboxes of its x.com recipient(s).

In block 404, the privacy enforcement circuitry 112 begins scanning the email message 306.

In block 405, the privacy enforcement circuitry 112 determines whether the sender of the email has previously been whitelisted (e.g., via the interface described below with reference to FIG. 9). If the sender has been whitelisted, the process advances to 420. If the sender has not been whitelisted, the process advances to block 406.

In block 406, each time tracking code is detected during the scan of the email message then the process advances to block 408.

In block 408, the identified tracking code is logged. This may comprise, for example, passing the tracking code and/or characteristics of the tracking code to analytics and reporting circuitry 117 where it is added to a database. In an example implementation, the privacy enforcement circuitry 112 may flag the email message 306 as having been tracked by the sender (e.g., add the text "tracked" to the subject line and/or message body).

In block 409, the privacy enforcement circuitry 112 determines whether the tracking code has previously been whitelisted (e.g., whitelisted via the interface described below with reference to FIG. 9). If the tracking code has been whitelisted, the process returns to block 406. If the tracking code has not been whitelisted, then the process advances to block 410.

In block 410, if the tracking code identified in block 406 is not associated with external content, then the process advances to block 412 in which the tracking code is removed from the email. After block 410, the process returns to block 406 and the scanning continues looking for more tracking code in the email message.

Returning to block 410, if the tracking code identified in block 406 is associated with external content (e.g., a tracked <img>, <a>, <scripts>, or <link> element having a URL pointing to an external content), then the process advances to block 414.

In block 414, the message modification circuitry 210 replaces the tracking code detected in block 406 with an untracked reference to the external content. For example, the tracking code may comprise an <img> element with a first URL, and the message modification circuitry 210 may replace the first URL with a second URL. The second URL may point to a copy of the external content which has been cached by content caching circuitry 115.

Figure 5:
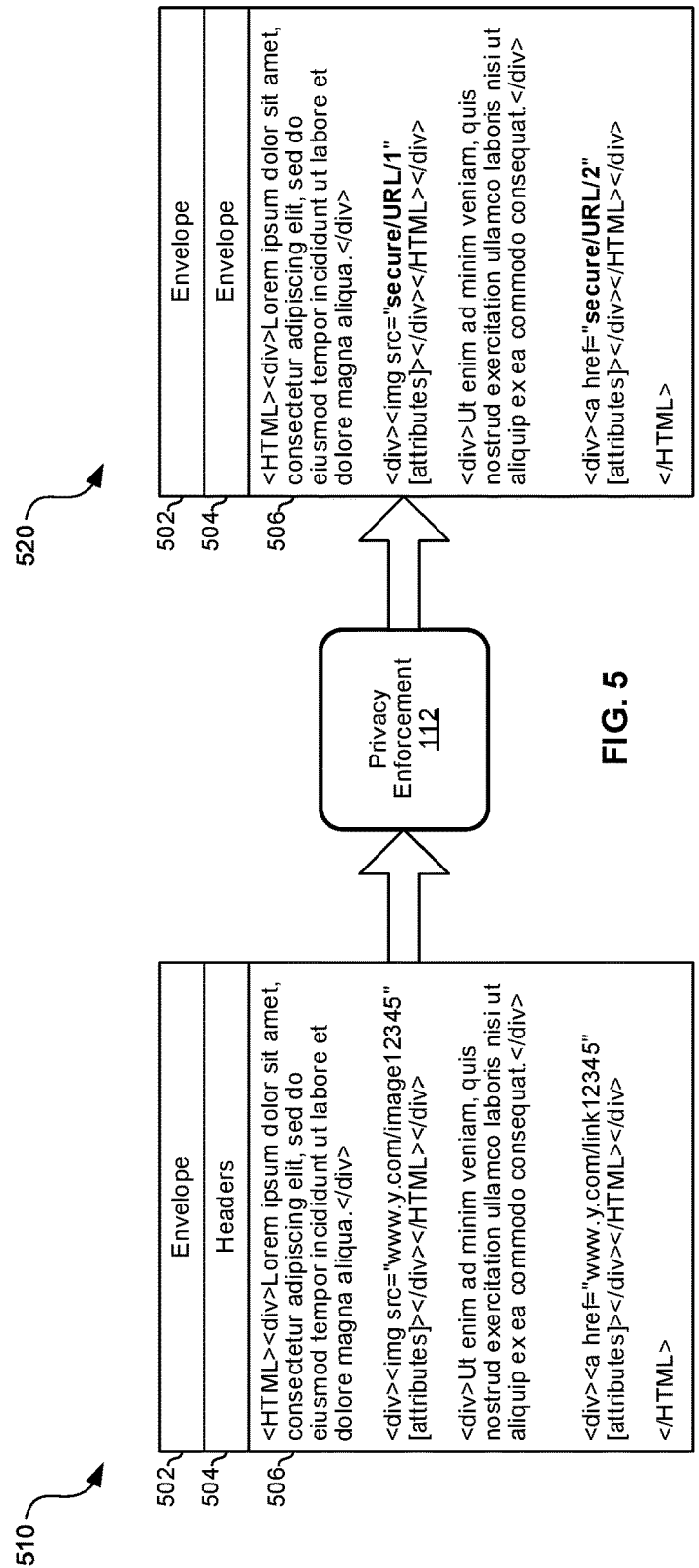
FIG. 5 illustrates an example processing of an email by the privacy enforcement circuitry of FIG. 1.

For example, referring briefly to FIG. 5, called out as 510 is email message 306 upon arriving at the privacy enforcement circuitry 112. Called out as 520 is the email message 306 after processing by the privacy enforcement circuitry 112. The email message 306 comprises SMTP envelope 502, message headers 504, and message body 506. The message body 506 comprises an <img> element having an original URL of "URL/to/image" and an <a> element having an original URL of "URL/to/anchor." After processing by the privacy enforcement circuitry 112, the original URL of the <img> element has been replaced with replacement URL "secure/URL/1." The replacement URL may point to a cached copy of the image which was pointed to by the original URL. Similarly, after processing by the privacy enforcement circuitry 112, the original URL of the <a> element has been replaced with replacement URL "secure/URL/2." The replacement URL may point to the ultimate destination (after any redirects, etc.) of the original URL.

In an example implementation, a replacement URL inserted by message modification circuitry 210 may comprise the original URL appended to or concatenated with a URL that points to a location under common control with the email system 102/144. The original URL may be appended as a query string, as one or more path element (path elements are separated by forward slashes), or as a combination of a path element(s) and query string. To illustrate, assume an original URL of www.y.com/image12345, then a corresponding replacement URL may be, for example: www.x.com/y/com/image12345 or www.x.com?y.com/image12345. In an example implementation, the replacement URL may comprise an API key assigned to x.com (the domain associated with email system 102/144). For example, assuming an API key of "1811WN" the replacement URL may be www.x.com/y/com/image12345/1811WN or www.x.com?y.com/image12345/1811WN. In an example implementation, a portion of the replacement URL may be hashed or encoded using a key uniquely associated with x.com (the domain associated with email system 102/144). For example, first the original URL and an API key may be appended to a URL controlled by the owners of x.com (e.g., www.x.com/y/com/image12345/1811WN or www.x.com?y.com/image12345/1811WN), and then a portion of the URL may be hashed or encrypted (e.g., www.x.com/y/com/image12345/1811WN becomes www.x.com/4eYTRDhhy432%^3, or www.x.com?y. com/image12345/1811WN becomes www.x.com?7DgeEF3$#$%d8y).

Returning to FIG. 4A, in block 416, it is determined whether the tracking code is already cached in the content caching circuitry 115 or is known to be unwanted or unneeded. Whether content is unwanted or unneeded may be determined based on one or more factors such as, for example: its transparency, its size (in pixels or bytes), its ALT text, whether the file name is on a black list, whether the URL at which the content is hosted (or any portion of the URL, such as domain) is on a black list, aliases or IP addresses associated with the URL at which the content is hosted, and/or the like. If the content is unwanted or unneeded, the process returns to block 406 and the scanning continues looking for more tracking code in the email message. If the content is not already cached and is not known to be unwanted or unneeded, then the process advances to block 418.

In block 418, the privacy enforcement circuitry 112 issues a request to the content caching circuitry 115 for the content caching circuitry 115 to download the external content and cache it. The privacy enforcement circuitry 112 may provide a first URL from which to retrieve the external content, and a second URL via which the cached content can be accessed. After block 418, the process returns to block 406 and the scanning continues looking for more tracking code in the email message. In an example implementation in which the content cache is in remote email subsystem 144 and the privacy enforcement circuitry 112 is in local email subsystem 102, the content cache interface circuitry 206 may queue up a plurality of URLs corresponding to content to be cached. The plurality of queued URLs may then be sent to the content caching circuitry 115 in a single request.

Returning to block 406, if no more tracking code is detected in the email message, then the process advances to block 420.

In block 420, the message, after having all tracking code removed or replaced, is passed to message storage handling circuitry 114, at which point it becomes available in its x.com recipient(s)' mailbox(es).

In block 422, data and/or metadata is passed to the analytics and reporting circuitry 117. Such data may include, for example, headers of the email message 306 and content and/or characteristics of tracking code detected in the email message 306 (e.g., URLs and/or HTML elements of the tracking code).

Figure 4B:
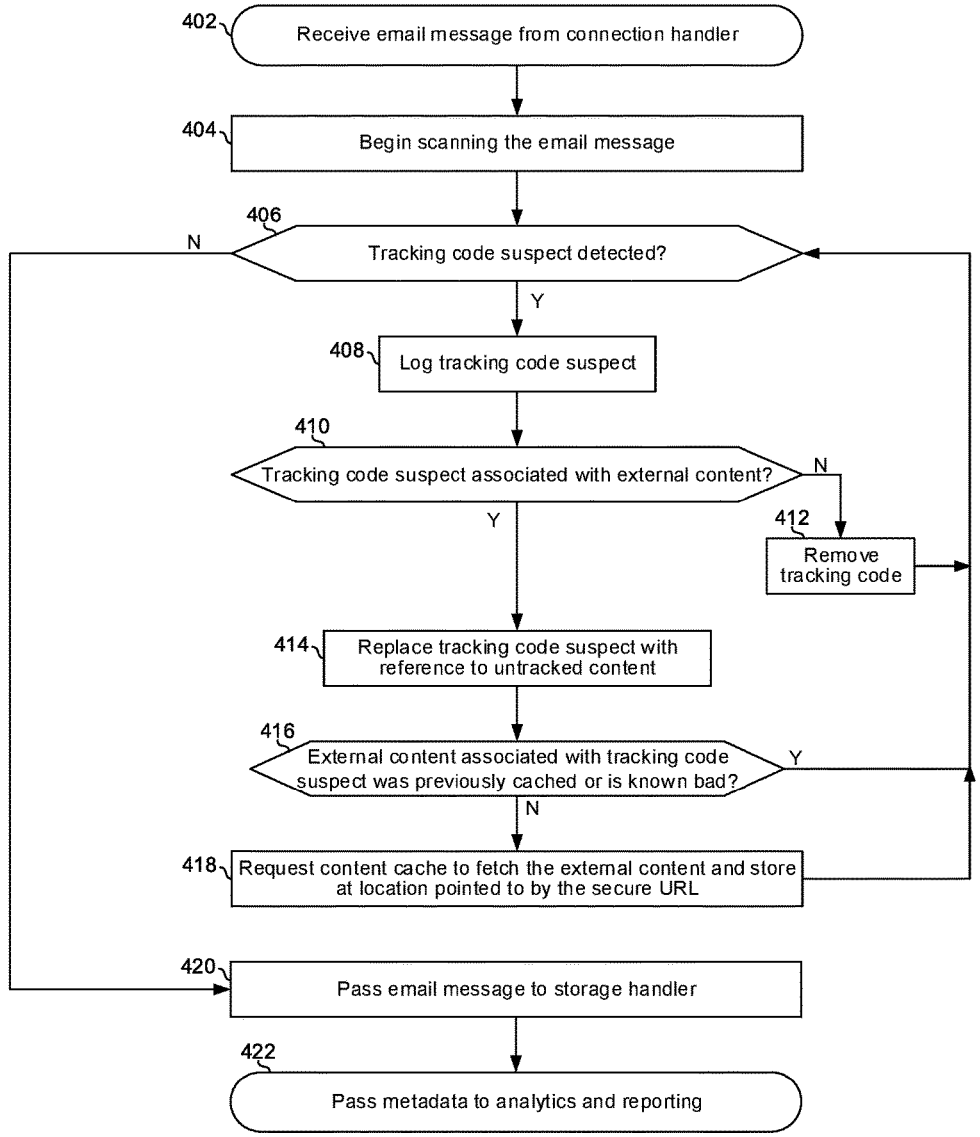
FIG. 4B is a flowchart illustrating an example process performed by the privacy enforcement circuitry of FIG. 1.

FIG. 4B is substantially similar to FIG. 4A except that all tracking code suspects (and not just confirmed tracking code) are either removed or replaced. In this manner, even if a tracking code suspect is incorrectly identified as not being tracking code, any external content associated with that tracking code suspect will nevertheless be cached by the content caching circuitry 115 before the email message becomes available in the recipient(s) inbox(es), thus preventing the sender of the email from knowing when and where the x.com recipient(s) read and forward the email message.

Removing tracking code and/or tracking code suspects from email message 306 before the email message reaches the inbox(es) of its intended x.com recipient(s) (the x.com RCPT TO recipient(s) as set by the sender's MUA), as done in the processes of FIGS. 4A and 4B, ensures that the recipient(s) privacy will be protected regardless of the email client(s) 120 or web client(s) 128 from which the recipient(s) check their email—all without the recipient(s) having to install or configure anything on their email client(s) 120 or web client(s) 128.

Figure 6:
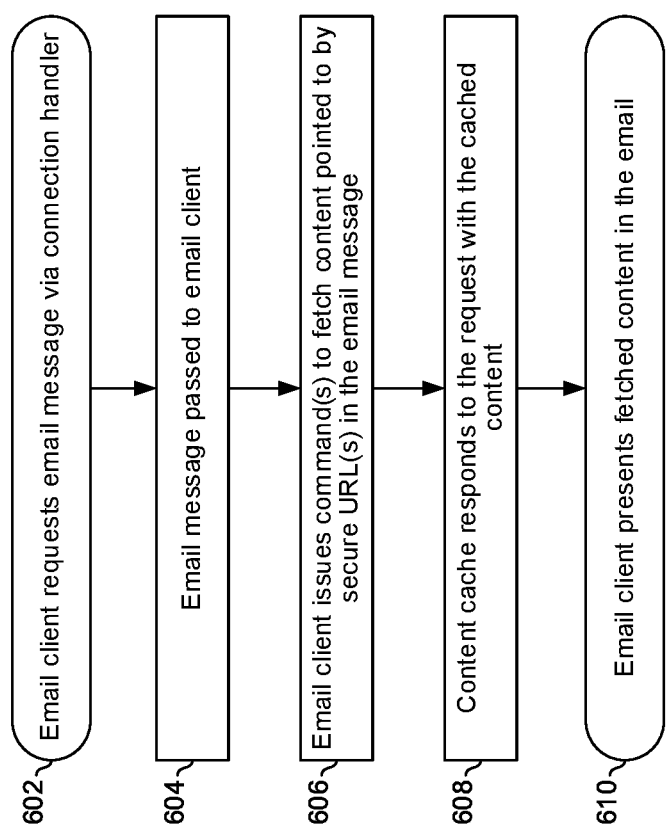
FIGS. 6 and 7 illustrate retrieval of an email stored in the on-premises email subsystem of FIG. 1 in accordance with an example implementation.
Figure 7:
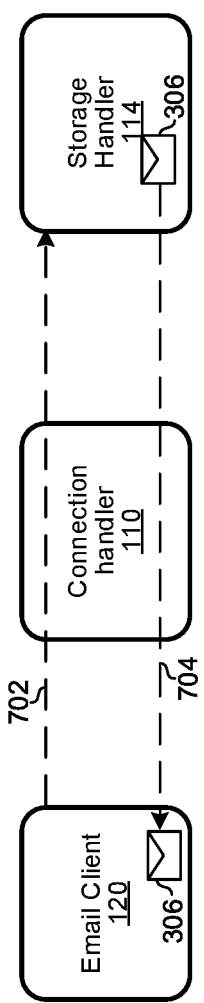

FIGS. 6 and 7 illustrate retrieval of an email stored in the on-premises email subsystem of FIG. 1 in accordance with an example implementation. The process in FIG. 6 begins with block 602 in which an email client 120 sends a request, via connection handler circuitry 110, for the email message 306 (which was processed by privacy enforcement circuitry 112 per FIGS. 3 and 4) from message storage handler 114.

In block 604, email message 306 is passed, via connection handler circuitry 110, to the email client 120.

In block 606, the email client 120 issues a command (e.g., an HTTP GET command) to fetch the image pointed to by the replacement URL.

In block 608, the content caching circuitry 115 receives the request from the email client 120, retrieves the image from storage 108, and sends the content to the email client (e.g., in an HTTP response).

In block 610, the email client 120 receives the image and presents it in the body of the email message 306. Because content caching circuitry 115 (and not email client 120) retrieved the image from the original URL, and because any subsequent requests for the image (whether by the same email client 120 or a different email client 120) will be served by content caching circuitry 115, the host of the original URL (and thus the sender of the email message 306) does not see: the type of device on which email client 120 is running, the location of the email client 120, the time that the email client 120 read the email message 306, or how many times email client 120 opened the email message 306.

In some instances, the content caching circuitry 115 may not yet have had a chance to retrieve and cache the image. In such instances, the content caching circuitry 115 may retrieve the image from the location pointed to by the original URL (which may be included in the HTTP GET command as, for example, a query string of the requested URL), cache the content at a location pointed to by the replacement URL, then send the response with the image to the email client 120.

In FIG. 7, arrow 702 represents the request sent from client 120 to storage handler 114. Arrow 704 represents the email message 306 being conveyed from storage handler 114 to email client 120.

Figure 8:
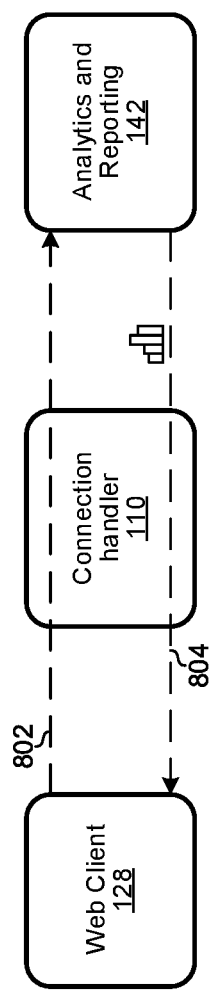
FIG. 8 illustrates the email system of FIG. 1 serving an analytics dashboard to a web client.

FIG. 8 illustrates the email system of FIG. 1 serving an analytics dashboard to a web client. The web client 128 issues a request (e.g., a HTTP POST request) 802 which is received (via connection handler circuitry 110) by analytics and reporting circuitry 142. The analytics and reporting circuitry 142 responds with content (HTML, javascript, CSS, etc.) that, when rendered in the web client 128, results in a dashboard such as the one described below with reference to FIG. 9.

Figure 9:
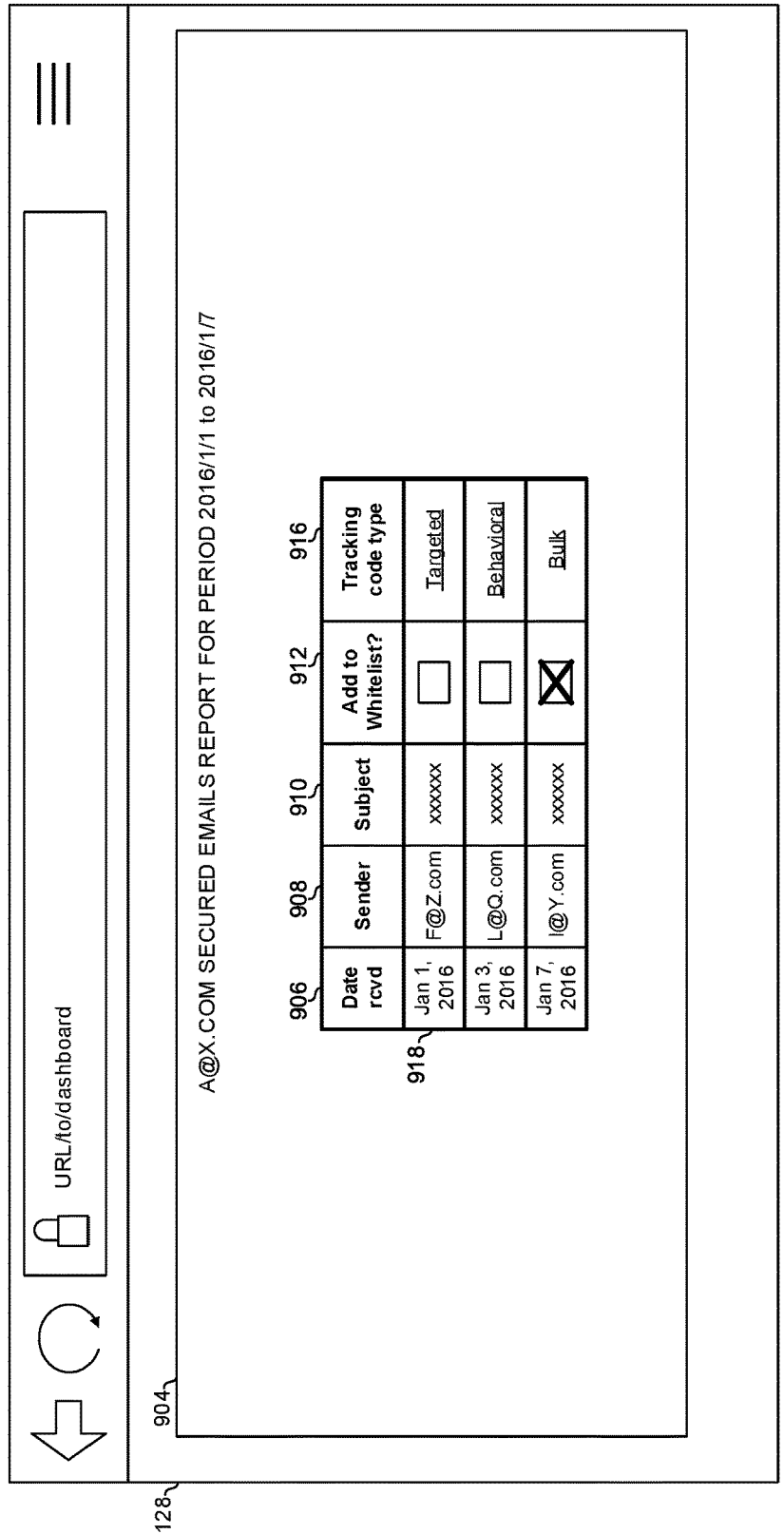
FIG. 9 illustrates an example dashboard of the email system of FIG. 1.

FIG. 9 illustrates an example dashboard of the email system of FIG. 1. Shown is a web client 128 displaying a browser window 904 in which is rendered a dashboard comprising interface elements that provide information about processing that has been completed by the email system 102/144 and interface elements via which a user can configure behavior of the email system 102/144. In the example shown, the interface elements are arranged into a table in which each row corresponds to an email message in which privacy enforcement circuitry 112 detected tracking code, and each column is as described below.

The cell in each row of column 906 holds the receipt date of the email message corresponding to the row. The email system 102/144 may have extracted the receipt date from the SMTP envelope and/or headers of the email message.

The cell in each row of column 908 holds the sender of the email message corresponding to the row. The email system 102/144 may have extracted the sender information from the SMTP envelope and/or headers of the email message.

The cell in each row of column 910 holds the subject line of the email message corresponding to the row. The email system 102/144 may have extracted the subject line from the headers of the email message.

In other embodiments, other columns similar to 906, 908, and 910 may be present and may hold other information extracted from the SMTP envelope, email message headers, email message body, and/or email message attachments.

The cell in each row of column 912 contains an interface element (e.g., a checkbox) that enables a user of the dashboard to add the sender of the email message to a whitelist. For example, checking the box in column 912 and row 918 may prevent the privacy enforcement circuitry 112 from removing or replacing tracking code in future emails from F@Z.com. In another example implementation, the dashboard may provide interface elements for whitelisting by domain (e.g., not replacing or removing tracking code from any sender with an @Z.com email address).

In another example implementation, the dashboard may comprise another or different table in which each row corresponds to an instance of identified tracking code. Such a table may show allow whitelisting or blacklisting particular tracking code or class/group of tracking code (e.g., whitelisting or blacklisting by domain, subdomain, and/or path elements).

The cell in each row of column 916 indicates a characterization of the corresponding email message. In the example shown, the characterization is a categorization of tracking code detected in the email message, where the categories are: individually targeted tracking code, behavioral marketing tracking code, and bulk marketing tracking code. This characterization may be determined based on, for example, the features provided by the tool which generated the tracking code (e.g., whether the tool provides information on location of the recipient at the time of open). In another example implementation, the characterization may be a risk level of the email message determined based on, for example, the sender (or just the sender's domain), the category of tracking code, and/or content of the message headers and/or body.

Figure 10:
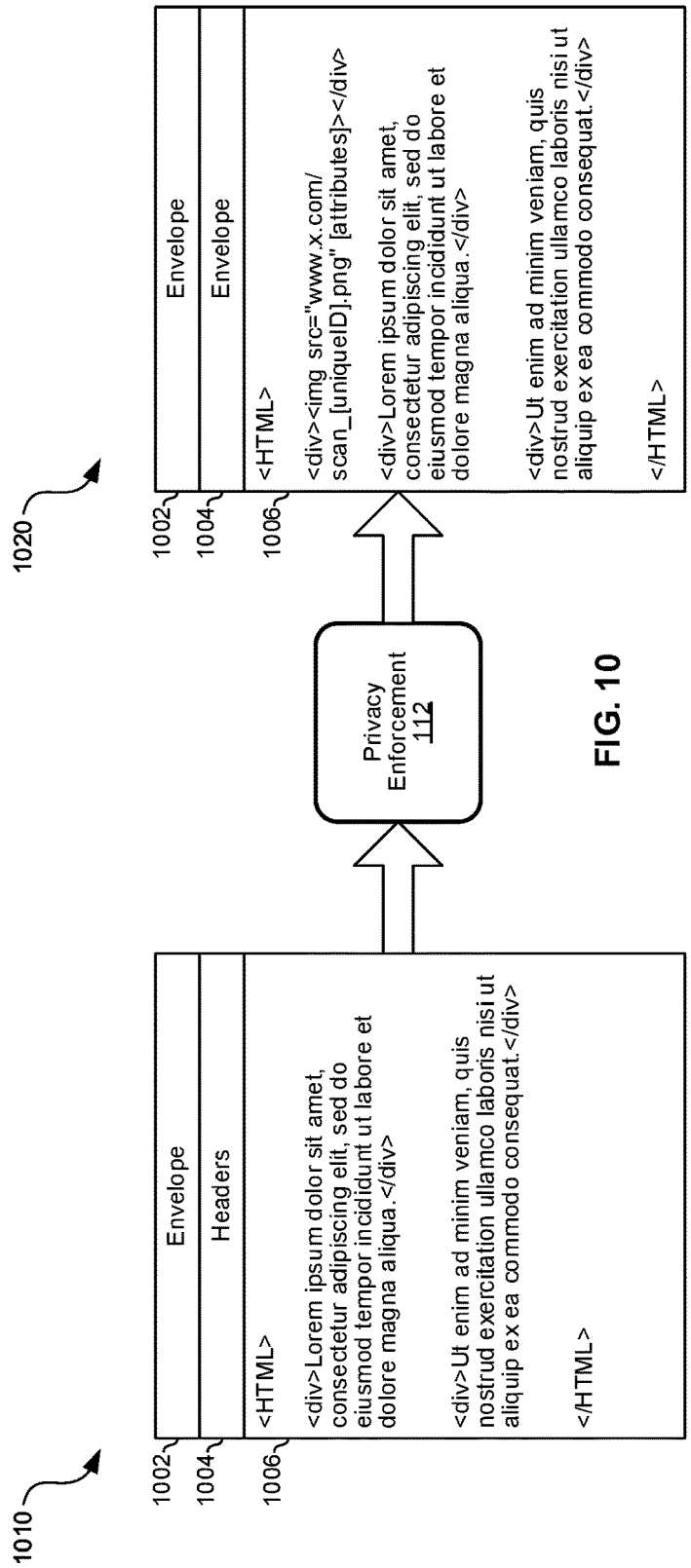
FIGS. 10 and 11 illustrate use of a dynamic image inserted by the privacy enforcement circuitry.
Figure 11:
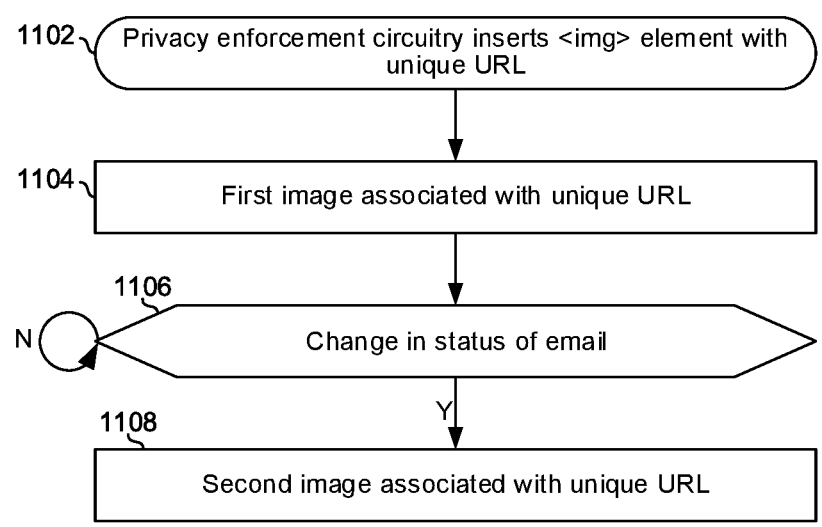

FIGS. 10 and 11 illustrate use of a dynamic image inserted by the privacy enforcement circuitry. Referring to FIG. 10, called out as 1010 is email message 306 upon arriving at the privacy enforcement circuitry 112. Called out as 1020 is email message 306 after being processed by privacy enforcement circuitry 112. The email message 306 comprises SMTP envelope 1002, email message headers 1004, and email message body 1006. In FIG. 10, the privacy enforcement circuitry 112 inserts, into body 1006, an <img> element referencing a URL that is under the control of email system 102/144. In the example, the URL is "www.x.com/status_[uniqueID].png," where "[uniqueID]" represents some unique identifier associated with the email message 306.

Now referring to FIG. 11, in block 1102, privacy enforcement circuitry 112 inserts an <img> element having a unique URL into email message 306.

In block 1104, the privacy enforcement circuitry 112 informs the content caching circuitry 115 of the inserted image and the unique URL. The content caching circuitry 115 associates the unique URL with an already-cached first image.

In block 1106, the process monitors for a change in status of the email message 306.

In block 1108, in response to a change in status of the email message 306, the unique URL is associated with an already-cached second image instead of the first image.

Through use of an <img> element in the body of the email, the status of the email message 306 will be seen by the user regardless of which email client 120 she happens to open the email on—there is no reliance on a particular browser or plugin, for example. In serving the first image or second image, the content caching circuitry 115 may indicate to the email client 120 that the image is not to be cached such that the email client 120 will fetch the latest image associated with the unique URL each time the email message 306 is opened.

In an example implementation, the change in status of the email message 306 the email message 306 either being flagged as a phishing attempt or not a phishing attempt upon the completion of a phishing analysis by the background processing circuitry 113. That is, the phishing analysis may take an amount of time that is longer than it is desired to delay delivery of the email message to the x.com recipient(s)' inbox(es). Accordingly, the email message 306 may be conveyed to background message processing circuitry 113 and to the message storage handling circuitry 114 in parallel. The first image may indicate through imagery (e.g., caution sign with caption "under review") that the scan is incomplete. The second image may indicate that the email is not a phishing attempt (e.g., the second image may be a green check mark) or may indicate that the email is likely a phishing attempt (e.g., a red x with the caption "phishing attempt"). In this manner, if the user opens the email message 306 and sees the first image, she knows to wait for the analysis to complete before interacting with the email. If the user opens the email message 306 and sees the second image indicating that the email is not a phishing attempt, she knows she that interacting with the email is low risk. If the user opens the email if the user opens the email message 306 and sees the second image indicating that the email is a phishing attempt, she knows to delete it and/or report it.

In accordance with an example implementation of this disclosure, a system comprises email message parsing circuitry (e.g., 204), tracking code suspect analyzer circuitry (e.g., 202), and message modification circuitry (e.g., 210). The email message parsing circuitry is operable to, after reception of an email message via a SMTP connection (e.g., via connection handler circuitry 110) and prior to the email message being made available in an inbox of a recipient of the email message (e.g., the recipient indicated in the RCPT TO command of the SMTP exchange), scan the email message to extract a tracking code suspect. The tracking code suspect analyzer circuitry is operable to analyze the tracking code suspect to determine, based on one or more characteristics of the tracking code suspect, whether the tracking code suspect is tracking code and, upon a determination that the tracking code suspect is tracking code, notify the message modification circuitry. The message modification circuitry is operable to replace the tracking code suspect in the email message with replacement content. The one or more characteristics of the tracking code suspect may comprise a transparency attribute and/or size attribute of an image associated with the tracking code suspect. The one or more characteristics of the tracking code suspect may comprise a uniform resource locator (URL) of the tracking code suspect. The one or more characteristics of the tracking code suspect may comprise a particular domain or subdomain in a uniform resource locator (URL) of the tracking code suspect. The one or more characteristics of the tracking code suspect may comprise a particular query string in a uniform resource locator (URL) of the tracking code suspect. The one or more characteristics of the tracking code suspect may comprise a particular path element or combination of path elements in a uniform resource locator (URL) of the tracking code suspect. The one or more characteristics of the tracking code suspect may comprise a domain or Internet Protocol (IP) corresponding to a uniform resource locator (URL) of the tracking code suspect. The one or more characteristics of the tracking code suspect may comprise a length, in number of alphanumeric characters, of the tracking code suspect. The one or more characteristics of the tracking code suspect may comprise characteristics of visible content of an image associated with the tracking code suspect. The characteristics of the visible content of the image may comprise color variation among pixels of the image. The one or more characteristics of the tracking code suspect may comprise presence of a particular substring in a uniform resource locator (URL) of the tracking code suspect. The one or more characteristics of the tracking code suspect may comprise a uniform resource locator (URL) of the tracking code suspect being a match for a particular regular expression. The tracking code suspect may comprise a first uniform resource locator (URL). The replacement content may comprise a second URL. The second URL may comprise the first URL as a query string. The second URL may comprise the first URL as one or more path elements. The system may comprise content cache interface circuitry (e.g., 206) operable to send the second URL to content caching circuitry. The system may comprise content caching circuitry (e.g., 115), and the content caching circuitry may be operable to fetch content from the first URL and store the content at a location pointed to by the second URL. 19. The system may comprise reporting circuitry. The tracking code suspect analyzer circuitry may be operable to determine which one of a plurality of categories (e.g., individually targeted, behavioral marketing, or bulk marketing; or "high risk, medium risk, or low risk") to assign to identified tracking code based on a domain or IP address associated with the identified tracking code, and assign the one of the plurality of categories to the identified tracking code. The system may comprise analytics and reporting circuitry (e.g., 117) is operable to generate a report (e.g., dashboard of FIG. 9) that presents the assigned one of the plurality of the categories for the identified tracking code. The system may comprise interface circuitry (e.g., part of analytics and reporting circuitry 117) operable to generate an interface via which a user can whitelist a sender of the email message such that the message modification will not remove tracking code in future emails from the sender.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. The machine-readable medium may be accessible via a network (e.g., the Internet) such that when the code is downloaded and installed on local machines, the local machines are configured into a system as described in this disclosure, and when the code is executed by such system, the system performs processes described in this disclosure.

While the present method and/or system has been described with reference to certain implementations, it will be understood by those skilled in the art that various changes may be made and equivalents may be substituted without departing from the scope of the present method and/or system. In addition, many modifications (e.g., re-ordering of flowchart blocks) may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    email message parsing circuitry, tracking code suspect analyzer circuitry, reporting circuitry, and message modification circuitry, wherein:
        the email message parsing circuitry is operable to:
            after reception of an email message via a simple mail transfer protocol (SMTP) connection and prior to the email message being made available in a mailbox of a recipient of the email message, scan the email message to extract a tracking code suspect;
        the tracking code suspect analyzer circuitry is operable to:
            analyze the tracking code suspect to determine, based on one or more characteristics of the tracking code suspect, whether the tracking code suspect is tracking code; and
            determine a risk level associated with the tracking code suspect based on one or more of: a sender of the email message, a domain of the sender of the email message, one or more headers of the email message, and a body of the email message;
        the reporting circuitry is operable to:
            after a determination that the tracking code suspect is tracking code, generate a report that indicates the presence of tracking code in the email message and indicates the determined risk level; and
        the message modification circuitry is operable to replace the tracking code suspect in the email message with replacement content.

2. The system of claim 1, wherein the one or more characteristics of the tracking code suspect comprise a transparency attribute and/or size attribute of an image associated with the tracking code suspect.

3. The system of claim 1, wherein the one or more characteristics of the tracking code suspect comprise a uniform resource locator (URL) of the tracking code suspect.

4. The system of claim 1, wherein the one or more characteristics of the tracking code suspect comprise a particular domain or subdomain in a uniform resource locator (URL) of the tracking code suspect.

5. The system of claim 1, wherein the one or more characteristics of the tracking code suspect comprise a particular query string in a uniform resource locator (URL) of the tracking code suspect.

6. The system of claim 1, wherein the one or more characteristics of the tracking code suspect comprise a particular path element or combination of path elements in a uniform resource locator (URL) of the tracking code suspect.

7. The system of claim 1, wherein the one or more characteristics of the tracking code suspect comprise a domain or Internet Protocol (IP) address corresponding to a uniform resource locator (URL) of the tracking code suspect.

8. The system of claim 1, wherein the one or more characteristics of the tracking code suspect comprise a length, in number of alphanumeric characters, of the tracking code suspect.

9. The system of claim 1, wherein the one or more characteristics of the tracking code suspect comprise characteristics of visible content of an image associated with the tracking code suspect.

10. The system of claim 9, wherein the characteristics of visible content of the image comprises color variation among pixels of the image.

11. The system of claim 1, wherein the one or more characteristics of the tracking code suspect comprise presence of a particular substring in a uniform resource locator (URL) of the tracking code suspect.

12. The system of claim 1, wherein the one or more characteristics of the tracking code suspect comprise a uniform resource locator (URL) of the tracking code suspect matching a particular regular expression.

13. The system of claim 1, wherein the tracking code suspect comprises a first uniform resource locator (URL).

14. The system of claim 13, wherein the replacement content comprises a second URL.

15. The system of claim 14, wherein the second URL comprises the first URL as a query string.

16. The system of claim 14, wherein the second URL comprises the first URL as one or more path elements.

17. The system of claim 14, comprising content cache interface circuitry operable to send the second URL to content caching circuitry.

18. The system of claim 17, comprising the content caching circuitry and wherein the content caching circuitry is operable to fetch content from the first URL and store the content at a location pointed to by the second URL.

19. The system of claim 1, wherein:
    the tracking code suspect analyzer circuitry is operable to:
        determine which one of a plurality of categories to assign to identified tracking code based on a domain or IP address associated with the identified tracking code; and
        assign the one of the plurality of categories to the identified tracking code.

* * * * *

UNITED STATES PATENT AND TRADEMARK OFFICE
CERTIFICATE OF CORRECTION

| | | |
|---|---|---|
| PATENT NO. | : 10,187,342 B2 | Page 1 of 1 |
| APPLICATION NO. | : 15/613343 | |
| DATED | : January 22, 2019 | |
| INVENTOR(S) | : Paul R. Everton et al. | |

It is certified that error appears in the above-identified patent and that said Letters Patent is hereby corrected as shown below:

On the Title Page

Please change the filing date item (22) from "Jun. 7, 2017" to -- Jun. 5, 2017 --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*